Sept. 19, 1950 D. E. SUNSTEIN 2,523,162

ELECTRICAL SYSTEM

Filed Oct. 3, 1945 3 Sheets-Sheet 1

INVENTOR.
DAVID E. SUNSTEIN
BY
Ostrolenk and Faber
ATTORNEYS

Sept. 19, 1950 D. E. SUNSTEIN 2,523,162

ELECTRICAL SYSTEM

Filed Oct. 3, 1945 3 Sheets-Sheet 2

INVENTOR.
DAVID E. SUNSTEIN

BY Ostrolenk and Faber

ATTORNEYS

Sept. 19, 1950 D. E. SUNSTEIN 2,523,162

ELECTRICAL SYSTEM

Filed Oct. 3, 1945 3 Sheets-Sheet 3

INVENTOR.
DAVID E. SUNSTEIN
BY
Ostrolenk and Faber
ATTORNEYS

Patented Sept. 19, 1950

2,523,162

UNITED STATES PATENT OFFICE 2,523,162

ELECTRICAL SYSTEM

David E. Sunstein, Cynwyd, Pa., assignor to Philco Corporation, a corporation of Pennsylvania Application October 3, 1945, Serial No. 620,155

12 Claims. (Cl. 315—21)

This invention relates to television receivers and more specifically, it has to do with an automatic type of regulator for maintaining the television picture in the center of the television receiving tube, and of the proper size.

Television receivers as presently constructed are provided with several controls. One is required in order to maintain the received picture at the correct size for the cathode-ray tube used to receive the television picture or to reconstitute it from the electrical impulses. Other controls are required in order to properly center the picture upon the screen, one for horizontal centering and one for vertical centering. In another type of receiver, two controls are employed for adjusting the size of the picture—one control adjusting the horizontal width of the picture and another control adjusting the vertical height of the picture. In some receivers, there are as many as six controls for these various purposes.

These plural controls add complexities to the operation of the television receiver which is intended for operation by the unskilled in such controls. It is the purpose of this invention to replace all of these controls by automatic control so that the operator of the television receiver is not required to carry out any of these adjustments.

In order to achieve this, in one form of my invention, I contemplate the use of four segments placed around the edge of the picture area of the cathode-ray tube which is used to reconstitute the picture from the electrical impulses. These four segments are constructed of conducting material placed on the inside of the tube and arranged with conducting leads so that electrical contact may be made to the segments from the outside of the tube. Two of these segments are placed, one to the left and one to the right of the picture area; and the two other of these segments are placed, one below and one above the picture area. Electrical circuits of a control type are connected to these segments so that if the picture tends to shift to one side or the other an automatic action occurs within the television receiver to shift the picture back to its normal or central position. Likewise, if the picture shifts upwards or downwards, the control action shifts the television picture back to the center of the tube. Moreover, if the picture tends to expand either horizontally or vertically, the electronic control circuits connected to these segments tend to set up counteracting influences within the television receiver, returning the picture to its proper size. Similarly, if the picture shrinks so that it is too small, counteracting influences are set up in the mechanism of the television receiver which cause the picture to increase to its full size.

In order for these actions to occur it is desirable, that the television picture overlap a little on all four sides onto the four segments. This means that the electron beam in sweeping across the area of the television picture, as is commonly done in the reconstitution of the television picture from the electrical impulses impinges to a certain extent upon each of the sectors at the beginning and end of each sweep, and as a result, current flows in each of the electrical circuits of which the sectors form a part. A specified value of this current can be considered to be the normal value of current flowing from these electrodes or segments. When these currents are all of equal magnitude the receiver is in a balanced condition so that no counteracting influences occur within the receiver.

If, however, one of these segments—for example, the right-hand segment, should experience an increase in current because of a shift of the electron sweep to cover more area of the righthand segment, either one of two actions has taken place—either the television picture has increased in width, or the television picture has moved to the right.

If at the same time that the current in the right-hand segment has increased, the current on the left-hand segment has decreased, it follows that the television picture has moved to the right so that the electron beam impinges upon the left-hand segment during less time than it impinges upon the right-hand segment. Consequently, less current flows in the circuit associated with the left-hand segment and more current flows in the circuit associated with the right-hand segment. These changes in current, then, are indicative of a motion to the right of the television picture.

If, however, the current in both electrodes or segments should increase, an increase in width of the television picture is indicated.

Similar circumstances exist for the vertical pair of segments. In what follows, the description will be confined to the horizontal pair of segments with the understanding that substantially the same type of circuits and action, but with correspondingly different time constants, could be used with the vertical pair of segments to keep the picture centered in the vertical direction and of the proper magnitude in the vertical direction.

In addition to the discovery that the current in the segments which I have placed within the cathode-ray tube are indicative of the particular type of shift either in position or in amplitude which has occurred in the cathode-ray picture on the screen of the cathode-ray tube, I have further found that these same currents can be used to provide automatic correction for the unwanted shift.

Thus, when both of the currents in the left and right segments are increased, electronic circuits are arranged so that an increased voltage develops, which voltage in turn decreases the horizontal sweeping voltage to the television tube. This, in turn, reduces the width of the television picture.

If an extraneous influence causes the television picture to tend to increase in size, as soon as the picture begins to increase, a voltage is set up which tends to prevent further increase. Naturally, in order to overcome a tendency which would normally cause the width of the telvision picture to increase considerably there must be a slightly increased voltage from the circuits associated with the two horizontal segments. Thus, the picture will still increase a small amount, but this increase will be considerably less than it would be without my automatic-control circuits.

Likewise, when increased current flows in the left-hand segment only, voltages are developed in associated circuits which cause the picture to be shifted to the right. Consequently, if through an external influence the picture is shifted to the left, the electronic circuits associated with the segment on the left tend to cause the picture to be shifted to the right. The net result is a very slight shift to the right. Similarly, if the picture tends to shift to the left in accordance with an external disturbing circumstance, actions will be set up within the electronic circuit which will tend to shift the picture to the right, but by an amount which will almost compensate for the influence of the external disturbance.

Thus, an object of my invention is to cause the television picture on the screen to be automatically centered.

A further object of my invention is to cause the television picture on the screen to be automatically held at the proper size.

A still further object of my invention is to make it possible to discard the adjustments for width and position of the picture on a television receiver.

Other objects and purposes of my invention become apparent from a study of the figures, in which.

Figure 1:
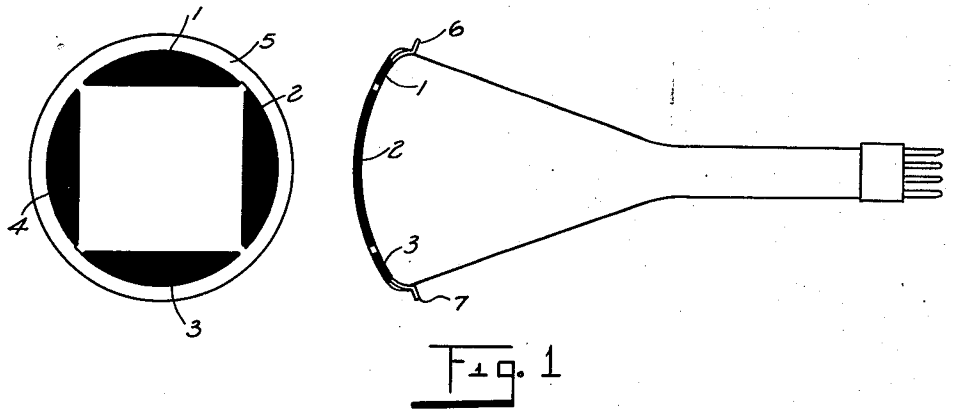
Figure 1 shows the location of the segments on the end of the cathode-ray tube.

Referring to Figure 1, four segments 1, 2, 3 and 4 made of conducting material are shown. These segments are placed at the end of the cathode-ray tube 5 of any well-known construction and here only schematically shown. Connections 6 and 7 from segments 1 and 3 are brought through the glass of the cathode-ray tube to the outside. Likewise, connections are made to segments 2 and 4 and appear in Figure 2 as leads 8 and 9.

Figure 2:
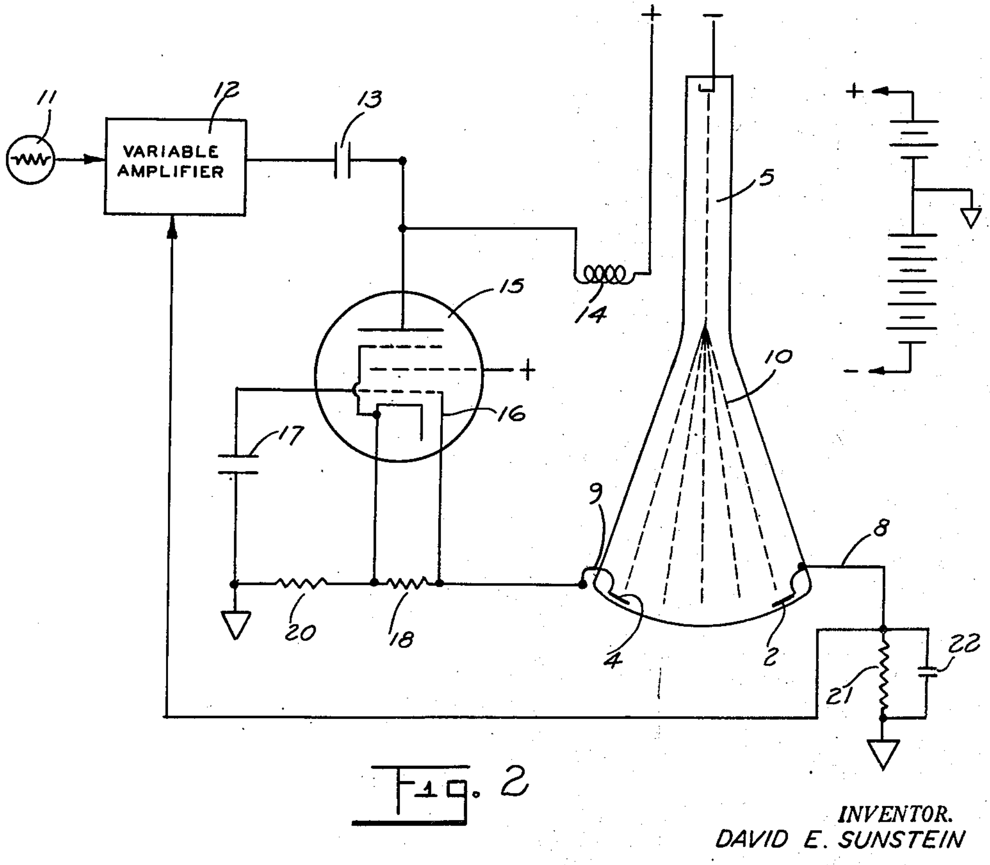
Figure 2 shows one circuit for automatic control.

In Figure 2 segments 1 and 3 are not shown in order to avoid confusion, since Figure 2 shows the circuit for the horizontal mechanism only. A similar system to that shown in Figure 2 can be used with segments 1 and 3 for the vertical control.

The cathode-ray tube 5 in Figure 2 is shown without complete deflecting and focusing means, but it is to be understood that any arrangement for focusing and deflecting electron beams may be used in this connection. The electron beam 10 is shown as a series of dotted lines spreading out across the tube as the beam would do during actual deflection.

The deflection of this beam is initiated by a saw-tooth oscillator 11 which feeds a variable-gain amplifier 12. The output of this amplifier is passed through a capacitor 13 and into a coil 14. This coil 14 is the deflecting mechanism for this cathode-ray tube, since the magnetic field set up by the current in this coil is the agency which deflects the electron beam. In an actual television receiver the magnetic axis of the coil 14 must, of course, be at right angles to the direction of deflection of the cathode-ray beam. Although magnetic deflection is here shown, it will be understood that any other form of deflection such as electrostatic may be employed.

Vacuum tube 15 feeds a steady direct current through coil 14. In view of the fact that it is a pentode its current is substantially constant for considerable ranges of voltage applied to the anode—particularly since the screen grid is connected to a fixed source of potential and the control grid 16 is by-passed to ground through a capacitor 17. The magnitude of the current which this tube feeds to coil 14 is controlled by the potential on control grid 16, and thus by the potential developed across resistor 18, which resistor carries the beam current which impinges upon segment 4 within the cathode-ray tube 5.

The action of this tube 15 is as follows: When the cathode-ray beam does not at any time in its travel impinge upon segment electrode 4, no current flows from ground through resistor 18 up to electrode 4. Consequently, there is no voltage difference between the cathode of tube 15 and its control grid. This means that maximum current passes through tube 15. But deflection coil 14 is so arranged that when maximum current passes through tube 15 the electron beam is deflected to the left. Consequently, the original condition of no part of the electron beam impinging upon electrode 4 cannot be maintained, since the steady current supplied by tube 15 to coil 14 will deflect the oscillating electron beam to the left and make it impinge heavily upon electrode 4.

As soon as current in the form of an electron stream begins to impinge on electrode 4, current flowing through resistor 18 causes the control grid of tube 15 to become negative in potential respect to the cathode of tube 15. This cuts down the current in deflecting coil 14 which, therefore, deflects the electron beam to the left less strongly than before. At some point a balance is effected in this action, so that the beam laps over onto electrode 4 only by a small amount. This balance point is determined principally by the value of resistors 18 and 20 and condenser 17 and the transconductance of tube 15.

If, now, an external influence should tend to deflect the cathode-ray beam to the right, the beam would tend to move off of segment 4. This would cause a reduction in the bias on the control grid 16, with consequent increase in the current flowing through deflection coil 14. The effect of this increase in deflection coil current is considerable, in that it will tend to return the beam to the left. Again a balance is achieved. But because of the amplification obtained by the vacuum tube 15, the beam is returned to substantially its previous position with the edge of the picture just lapping over the edge of electrode 4.

In addition to the current supplied to deflecting coil 14 by tube 15, there is the alternating component of current supplied by variable-gain amplifier 12 through capacitor 13. It is this signal which causes the rapid, back-and-forth scanning deflection of the electron beam in the picture tube. In order that the resulting variations in current flowing into electrode 4 shall not affect tube 15, capacitor 17 is placed between the control grid 16 and ground. This capacitor tends to smooth out the variations in potential on control grid 16; so that this control grid will not follow the variations in potential caused by the operation of the successive sweeps, but will follow only an average.

Thus, in the design of this circuit certain compromises must be made between the value of capacitor 17 and the values of resistors 18 and 20. The time-constant involved is preferably sufficiently high so as to average out the individual sweeps of the variable-gain amplifier, but the time constant must not be too long, as otherwise the system will not respond sufficiently quickly to a disturbance. The time constant may, in fact, be comparable to the period of one sweep, in which case the current drawn by tube 15 will contribute to the scanning, and may be used to linearize the saw-tooth emergent from amplifier 12 if not linear.

The action which has been described above maintains the left-hand side of the picture oriented on the edge of electrode 4. In order to keep the right-hand side of the picture similarly oriented on the edge of the electrode 2, the electron beam current entering electrode 2 is passed through resistor 21 and capacitor 22. Alternating current components flow through capacitor 22, and direct current components flow through resistor 21. The voltage developed across resistor 21 is used in variable-gain amplifier 12 in such a manner that if the voltage rises across resistor 21 as it would if the current in electrode 2 increases, then the gain of amplifier 12 is decreased. This is again an automatic self-limiting action, for if any external disturbance should tend to make the sweep become longer and dwell for a longer period upon electrode 2, more voltage is developed across resistor 21, which in turn lowers the gain of amplifier 12 and decreases the extent of the sweep of the electron beam. Thus, the right-hand edge of the picture is held just on the edge of electrode 2.

A similar system could be used with electrodes 1 and 3, to control the vertical position and the vertical width of the picture.

Figure 3:
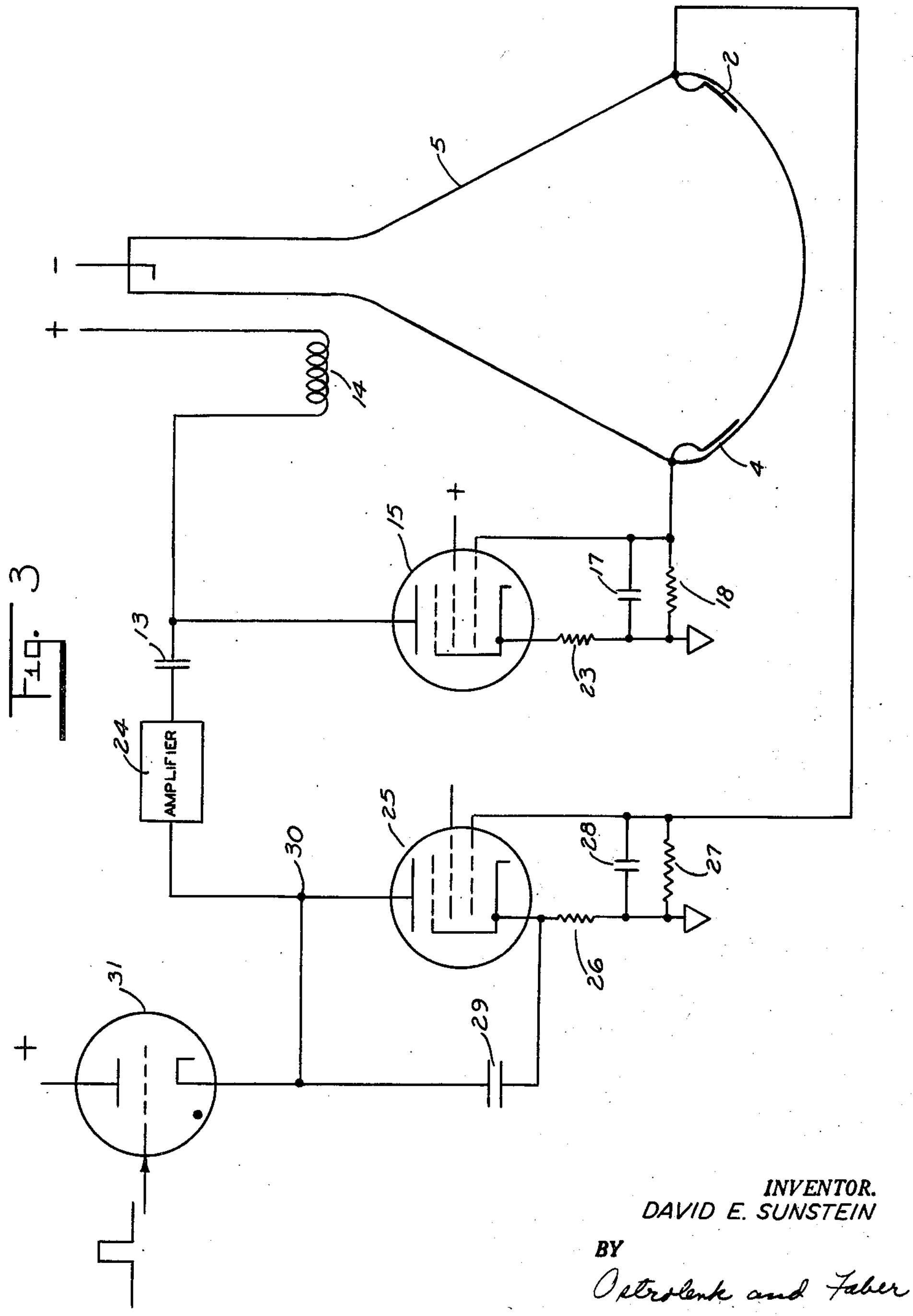
Figure 3 shows another circuit for automatic control.

An alternative embodiment of the circuit for obtaining similar action is shown in Figure 3. In this circuit substantially the same system is used for the control of the left-hand edge of the picture as was used in Figure 2, except that the biasing arrangement on the grid of tube 15 has been modified. Resistor 18 is used, resistor 20 having been dispensed with and replaced by a cathode resistor 23. This makes it possible to have a negative grid voltage occur even through no electron beam impinge on segment 4.

For electrode 2 a similar circuit to that involving tube 15 is used. Thus tube 25 is supplied with a fixed screen voltage, and is connected in circuit with a cathode resistor 26, a grid resistor 27, and a grid capacitor 28. Electron current entering electrode 2 flows through resistor 27, placing a negative potential upon the control grid of tube 25. Tube 25 acts as a constant current source so that it drains the charge from capacitor 29 at a uniform rate. Thus the potential on terminal 30 drops uniformly with time, and it is this potential which is applied to the input of amplifier 24, which feeds capacitor 13, which in turn feeds deflection coil 14.

In order to obtain a saw-tooth voltage at terminal 30, gaseous tube 31 is used. The grid of this tube is supplied with a signal from the synchronizing pulse separator. Thus, for every synchronizing pulse, tube 31 is made conducting, and the current flows through the tube 31, and charges capacitor 29 to a fixed voltage determined by the potential supplied to the anode of tube 31. During the time of this action, capacitor 29 charges until such time as the current in tube 31 decreases to the value at which it ceases abruptly. As soon as tube 31 has been extinguished, capacitor 29 commences to discharge through tube 25 at a rate determined by the voltage upon the grid of tube 25. This discharge, as has been indicated, provides the sweep signal through coil 14. Thus the electron beam is swept across the face of the cathode ray tube until such time as another synchronizing pulse impinges upon the grid of tube 31. When this occurs capacitor 29 is abruptly charged up through resistor 26 and tube 31 to its full value again, and the electron beam in the cathode ray tube is returned to the left-hand position.

If the electron beam, in its travel across the face of the cathode-ray tube, just reaches the edge of electrode 2 before it returns to the left-hand side, a small current will flow through resistor 27 which will provide a grid bias on tube 25. If through external circumstances and disturbances the electron beam no longer touches segment 2, no current will flow through resistor 27—so the tube 25 will pass its maximum current. This will cause capacitor 29 to discharge more rapidly, which will cause a greater rate of change of the voltage across the input to the amplifier. Consequently, the sweeping signal applied to the electron beam in the cathode ray tube will increase. This will cause the beam to sweep further across the tube and to impinge upon electrode 2 which in turn will cause more current to flow into electrode 2, sending more electron current through resistor 27. This will in turn lower the grid bias on tube 25, which will cause the current in tube 25 to decrease. This decreasing current in tube 25 lessens the swing of voltage of terminal 30 and, therefore, lessens the sweep of the electron beam. This system achieves balance at the point when the electron beam just barely impinges upon the edge of electrode 2. Consequently, the action of this circuit has the action of the circuit of Figure 2, holding the right-hand edge of the picture on the edge of segment 2.

In a similar fashion a circuit could be arranged for holding the vertical deflection of the picture between electrodes 1 and 3. Since the synchronizing signals are somewhat different for the vertical synchronization than they are for the horizontal synchronization, the input to tube 31 for vertical control should be obtained from the vertical synchronizing signal. Likewise, the time constants in the various parts of the circuit will be different because vertical synchronizing occurs at a slower rate than does horizontal sweeping. Nevertheless, by proper choice and design, time constants for this circuit can be obtained which will level out the variations between sweeps and still will cause a response which is sufficiently rapid so that the picture will stay substantially in the center of the face of the cathode-ray tube, and so that it will not have much changes in width and height of the picture.

It is of course possible to modify both Figure 2 and Figure 3 so that deflecting coil 14, which may be high impedance, is fed only controlling signal from tube 15, while the output of amplifiers 12 or 24 may feed a separate parallel acting deflecting coil, which may conveniently be low impedance.

In the preceding description, I have disclosed means whereby all of the size and centering controls of a television receiver may be replaced by automatic means. In certain types of receivers, however, it becomes unnecessary to supply all of these controls. For example in a straight gun television receiver tube of customary design in which magnetic deflection means is used, the centering of the beam is of little importance since the beam automatically centers itself. This results from the fact that the centering of the beam is in geometric relationship with respect to the arrangement of the electrodes within the cathode ray tube or television tube, with the magnetic deflecting means coupled to the appropriate amplifier by means of a transformer. There is no possibility for direct current to operate the deflecting means. Consequently, the deflecting means do not provide an influence which would shift the picture off center. In such an arrangement, it may become unnecessary to provide centering controls. In this circumstance, it is possible to dispense with two of the border electrodes.

Figure 4:
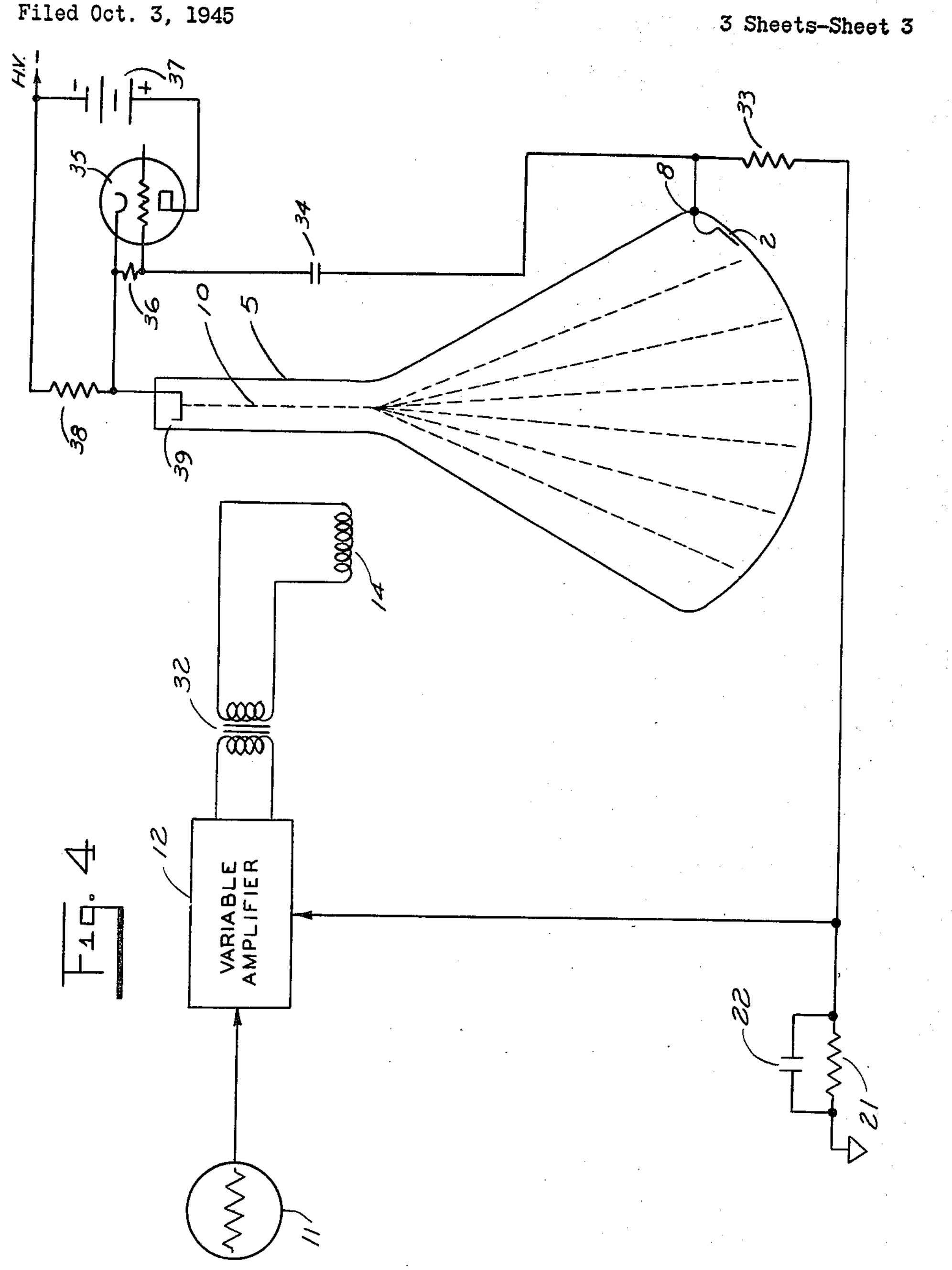
Figure 4 shows another circuit for automatic control.

Figure 4 shows a circuit in which this has been done for one of the directions of deflection. This figure is a modification of Figure 2, in which border electrode 4 has been dispensed with, leaving only border electrode 2 to control the amplitude of the deflection of the electron beam in one of its possible directions of deflection. In this circuit the cathode ray tube 5 has generated within it an electron beam 10, which is deflected by deflection coil 14 to bend the electron beam as indicated by the spread of the electron beam 10 in the lower end of the cathode ray tube. At the extreme travel of this spreading beam, the border electrode 2 receives a certain part of the electron beam. The electron beam current impinging upon border electrode 2 travels through lead 8, through resistor 33, the function of which will be described later, to resistor 21 to ground. Alternating current components of the voltage developed across resistor 21 are carried through capacitor 22 to ground. Consequently, the voltage drop appearing across resistor 21 and capacitor 22 is fundamentally a direct voltage. This voltage is fed into variable amplifier 12 and is used in this amplifier to control the gain of this amplifier. This amplifier is fed with a signal from a saw-tooth signal generator 11 and the output of this amplifier is fed to the deflection coil 14 through transformer 32. If the gain of the amplifier is insufficient, the spreading of the electron beam is too small and consequently, no electron beam current enters the border electrode 2.

Consequently, no control signal is applied to variable amplifier 12. With no control signal applied, however, this amplifier gives full gain which in turn causes the deflection of the electron beam to increase. This increase occurs until the strength of the electron beam current impinging upon border electrode 2 provides a sufficient voltage drop across resistor 21 to cut down the gain of variable amplifier 12 to such a point that a balance is obtained in the relationship of the circuit. When this balance is obtained, the gain of amplifier 12 is just sufficient to cause the proper amount of deflection of the electron beam to give the bias voltage across resistor 21 to maintain the amplifier at the gain mentioned. If the gain should become too high through extraneous reasons, the voltage across resistor 21 will increase in view of the increased beam current entering border electrode 2. Consequently, the gain of the amplifier will be reduced into a balance value again. This action will keep the width of the electron spread so that it just impinges in its edge upon border electrode 2. This has been accomplished without the use of border electrode 4, in view of the fact that the deflection means and geometry of the television tube itself insure centering of the picture. In this tube a similar arrangement could be applied to the vertical deflection means or to the deflection means at right angles to the deflection means shown in Figure 4. Under these circumstances only two electrodes for bordering purposes would be required instead of the four in the previous circuit. It would be possible also to make use of only one bordering electrode, provided means were available for insuring stability of the gain of the system in one of the directions. This follows from the fact that the stabilization of the width of the picture in one direction is independent of the stabilization of the width of the picture in the other direction.

In order that the positioning control apparatus of Figures 2, 3 and 4 functions independently of the type of reproduced picture, it is preferable that the beam current be finite and unmodulated with picture signals at the extreme deflected positions of the beam. Preferably the beam is to be of maximum intensity at the extreme deflected position. A suitable method of accomplishing this unblanking is shown in Figure 4, and it is understood that similar means may be added to Figures 2 and 3. To effect the desired unblanking, the alternating component of voltage developed across resistor 33 is applied through a blocking condenser 34 to the grid of a cathode follower tube 35. The grid bias of the tube 35 is normally maintained near zero by grid return resistor 36, thereby causing large current to flow from voltage supply 37 through tube 35 and through load resistor 38. This causes the cathode 39 of the cathode ray tube to be normally maintained substantially positive with respect to the negative end of high voltage supply. Under this normal condition, the beam current is modulated with the picture signal in conventional manner by means of a signal applied between the negative end of the high voltage supply and an intensity modulating electrode (not shown). When, however, the beam is deflected so that it impinges upon electrode 2, then a negative pulse is applied to the grid of tube 35 by virtue of the drop created across resistor 33. This pulse causes a reduction in the current drawn by tube 35 through load resistor 38, thereby causing the cathode of the cathode ray tube to go more negative, thereby causing in turn an increase of beam current of the cathode ray beam. This action causes a resultant increased drop across resistor 33, rendering the action regenerative until the circuit has saturated at a large value of beam current, at which equilibrium is attained. Thus, the beam will always be unblanked when deflected upon electrode 2, but when the beam is deflected over the picture area of the cathode ray tube, its intensity is under control of the usual intensity modulating means.

It now becomes evident that the particular need for automatic control circuits will determine the particular arrangement of the control circuit which is to be used in a given circumstance. As it may be that horizontal centering and gain limitation will be required, whereas vertical limitation and centering will not be required, under these circumstances only two oppositely placed border electrodes, for example, electrodes 2 and 4 in Figure 1, may be employed. Similarly, it may be that only the vertical deflection will need automatic centering and width control. In such a circumstance, only the border electrodes 1 and 3 are needed. Under other circumstances, it might be that horizontal amplitude control and vertical centering would be needed, in which case electrodes 2 and 3 might be the only border electrodes which would be required. In fact, any combination of electrodes which is needed to accomplish the purposes desired, may be used in preference to the use of all four of the electrodes.

In what has preceded I have described several methods of obtaining automatic control of the width and the height of a television picture, as they might be influenced by external disturbances such as fluctuations in the line voltage. Although I have described several embodiments of my invention in the description above, I prefer to have my invention limited only by the following claims.

I claim:

1. In a cathode ray tube circuit having an emitter, a screen and deflecting means, a plurality of members adjacent opposite sides of said screen, a source of sawtooth voltage, a first electron tube having a positively biased grid, an anode connected to said deflection means and an input electrode connected to one of said members, a second electron tube having circuit connections to said first mentioned source, said deflecting means, and to the other of said members, and a circuit having a predetermined time constant connected to said second tube in the circuit to said other of said members.

2. In a cathode ray tube circuit having a cathode ray beam generating means, deflecting means for controlling said beam, a screen, an electrode adjacent said screen, a source of signal energy for energizing said deflecting means, circuit connections from said electrode to said last mentioned source for controlling said source, and electronic means including circuit connections from said electrode to said cathode ray beam generating means for controlling the intensity of the beam in accordance with the deflection of said beam to said electrode.

3. In a receiver for an electrical picture transmission system, a cathode ray tube having a srceen and electron emitter, a conducting element at one edge of said screen, an electron tube having an input and an output circuit, circuit connections from the input of said electron tube to said conducting element, a deflecting means for said electron stream of said cathode ray tube, circuit connections from the output of said electron tube to said deflecting means, means for applying a steady current on said deflecting means when said electron beam is not impinged on said conducting element and for reducing said current when said electron beam is impinged on said conducting element, said means including said circuit connections to the input of said electron tube, a source of saw-tooth wave energy and circuit connections from said source of wave energy to said deflecting means for applying a signal of a predetermined scanning frequency.

4. In a receiver for an electrical picture transmission system, a cathode ray tube having a screen and electron emitter, a conducting element at one edge of said screen, an electron tube having an input and an output circuit, circuit connections from the input of said electron tube to said conducting element, a deflecting means for said electron stream of said cathode ray tube, circuit connections from the output of said electron tube to said deflecting means, means for applying a steady current on said deflecting means when said electron beam is not impinged on said conducting element and for reducing said current when said electron beam is impinged on said conducting element, said means including said circuit connections to the input of said electron tube, a source of saw-tooth wave energy and circuit connections from said source of wave energy to said deflecting means for applying a signal of a predetermined scanning frequency to said deflecting means, and a time constant circuit connected to the input of said electron tube, said time constant being so related to the frequency of said source of deflecting energy that said electron tube is responsive to the average effects of the electron beam impingement on said conducting element.

5. In a receiver for an electrical picture transmission system, a cathode ray tube having a screen and electron emitter, a first conducting element at one edge of said screen, a second conducting element at the opposite edge of said screen, a source of saw-tooth wave energy, circuit connections from said source of energy to said deflecting means, electron means including circuit connections to said first conducting element and to said deflecting means for applying a steady current on said deflecting means superimposed on said wave energy when said electron beam impinges on said first conducting element and for increasing the value of said steady current when said electron beam does not impinge on said first element, and means including circuit connections from said second element to said source of wave energy for reducing the value of said wave energy when said electron beam impinges on said second conducting element from the value of said wave energy when said electron beam does not impinge on said second conducting element.

6. In a receiver for an electrical picture transmission system, a cathode ray tube having a screen and electron emitter, a conducting element at one edge of said screen, an electron tube having an input and an output circuit, circuit connections from the input of said electron tube to said conducting element, a deflecting means for said electron stream of said cathode ray tube, circuit connections from the output of said electron tube to said deflecting means, means including said circuit connections to the input of said electron tube for rendering said tube conductive when said electron beam is not impinged on said conducting element and for reducing the conductivity of said tube when said electron beam is impinged on said conducting element, a source of saw-tooth wave energy of a predetermined frequency, circuit connections from said source of energy to said deflecting means, and a time constant circuit connected to the input of said electron tube, said time constant being so related to the frequency of said source of deflecting energy that said electron tube is responsive to the average of the electron beam impinged on said conducting element.

7. In a receiver for an electrical picture transmission system, a cathode ray tube having a screen and electron emitter, a deflecting means for said electron screen, a conducting element at one edge of said screen, a source of saw-tooth wave energy including a gas discharge tube, an amplifier having an input and output circuit, said input circuit being connected to said gaseous discharge tube and said output being connected to said deflecting means, and means for varying the value of said saw-tooth wave energy applied to said deflecting means comprising an electron tube having an input and an output, circuit connections from the output of said electron tube to the input of said amplifier, circuit connections from the input of said electron tube to said conducting element and a capacitor connected to said gaseous discharge tube and across the input and output of said electron tube for receiving charging currents from said gaseous discharge tube, said capacitor discharging through said electron tube in accordance with control thereof from said conducting element by said cathode ray tube electron beam impinging on said conducting element.

8. In a receiver for an electrical picture transmission system, a cathode ray tube having a screen and electron emitter, a deflecting means for said electron stream, a conducting element at one edge of said screen, a source of saw-tooth wave energy, a variable amplifier having an input connected to said source, a transformer connected to the output of said amplifier, circuit connections from the secondary of said transformer to said deflecting means, circuit connections from said conducting element to said amplifier, means including said last mentioned circuit connections for varying the gain of said amplifier in accordance with whether or not said electron beam of said cathode ray tube is impinged on said conducting element.

9. In a receiver for an electrical picture transmission system, a cathode ray tube having a screen and electron emitter, a first conducting element at one edge of said screen, a second conducting element at the opposite edge of said screen, a sourre of saw-tooth wave energy, circuit connections from said source of energy to said deflecting means, electron means including circuit connections to said first conducting element and to said deflecting means for applying a steady current on said deflecting means superimposed on said wave energy when said electron beam impinges on said first conducting element and for increasing the value of said steady current when said electron beam does not impinge on said first element, means including circuit connections from said second element to said source of wave energy for decreasing the value of said wave energy when said electron beam impinges on said second conducting element over the value of said wave energy when said electron beam does not impinge on said second conducting element, and means whereby the deflecting electron beam impinged on said conducting element is of a constant predetermined unmodulated value.

10. In a receiver for an electrical picture transmission system, a cathode ray tube having a screen and electron emitter, a first conducting element at one edge of said screen, a second conducting element at the opposite edge of said screen, a source of saw-tooth wave energy, circuit connections from said source of energy to said deflecting means, electron means including circuit connections to said first conducting element and to said deflecting means for applying a steady current on said deflecting means superimposed on said wave energy when said electron beam impinges on said first conducting element and for increasing the value of said steady current when said electron beam does not impinge on said first element, means including circuit connections from said second element to said source of wave energy for decreasing the value of said wave energy when said electron beam impinges on said second conducting element over the value of said wave energy when said electron beam does not impinge on said second conducting element, means whereby the deflecting electron beam impinged on said conducting element is of a constant predetermined unmodulated value, said means comprising a resistor connected in said circuit connections from said conducting element, and a cathode follower tube connected to said resistor and circuit connections from the output of said cathode follower tube to the electron emitter of said cathode ray tube.

11. In a receiver for an electrical picture transmission system, a cathode ray tube having a screen and electron emitter, a conducting element at one edge of said screen, an electron tube having an input and an output circuit, circuit connections from the input of said electron tube to said conducting element, a deflecting means for said electron stream of said cathode ray tube, circuit connections from the output of said electron tube to said deflecting means, means for applying a control signal on said deflecting means when said electron beam is not impinged on said conducting element for deflecting said electron beam toward said conducting element and for modifying said control signal when said electron beam is impinged on said conducting element, said means including said circuit connections to the input of said electron tube, a source of saw-tooth wave energy and circuit connections from said source of wave energy to said deflecting means for applying a signal of a predetermined scanning frequency.

12. In a receiver for an electrical picture transmission system, a cathode ray tube having a screen and electron emitter, a conducting element at one edge of said screen, an electron tube having an input and an output circuit, circuit connections from the input of said electron tube to said conducting element, a deflecting means for said electron stream of said cathode ray tube, circuit connections from the output of said electron tube to said deflecting means, means for applying a control signal on said deflecting means when said electron beam is not impinged on said conducting element for deflecting said electron beam toward said conducting element and for modifying said control signal when said electron beam is impinged on said conducting element to deflect said electron beam from said conducting element to a point of balance at which the beam laps over on to said electrode by a small balancing amount, said means including said circuit connections to the input of said electron tube, a source of saw-tooth wave energy and circuit connections from said source of wave energy to said deflecting means for applying a signal of a predetermined scanning frequency.

DAVID E. SUNSTEIN.

REFERENCES CITED

The following references are of record in the file of this patent:

UNITED STATES PATENTS

| Number | Name | Date |
|---|---|---|
| 1,976,400 | Ilberg | Oct. 9, 1934 |
| 2,098,598 | Schroter | Nov. 9, 1938 |
| 2,185,601 | McGee et al. | Jan. 2, 1940 |
| 2,216,273 | Knick | Oct. 1, 1940 |
| 2,223,990 | Holmes | Dec. 3, 1940 |
| 2,287,296 | Dallos | June 23, 1942 |
| 2,307,212 | Goldsmith | Jan. 5, 1943 |
| 2,417,450 | Sears | Mar. 18, 1947 |

FOREIGN PATENTS

| Number | Country | Date |
|---|---|---|
| 388,370 | Great Britain | Feb. 14, 1933 |